(12) United States Patent
Chen et al.

(10) Patent No.: US 7,734,704 B2
(45) Date of Patent: Jun. 8, 2010

(54) METHOD AND SYSTEM FOR IDENTIFYING AND AUTOMATICALLY REDISPLAYING UNREAD INSTANT MESSAGES

(75) Inventors: Yen-Fu Chen, Austin, TX (US); John Hans Handy-Bosma, Cedar Park, TX (US); Patsy Annette Spears, Round Rock, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 11/460,642

(22) Filed: Jul. 28, 2006

(65) Prior Publication Data

US 2008/0028026 A1 Jan. 31, 2008

(51) Int. Cl.
*G06F 15/16* (2006.01)
(52) U.S. Cl. ...................... 709/206; 434/179
(58) Field of Classification Search ............. 709/206; 434/179, 180, 183
See application file for complete search history.

(56) References Cited

U.S. PATENT DOCUMENTS

| 7,124,123 | B1* | 10/2006 | Roskind et al. | 706/60 |
|---|---|---|---|---|
| 7,406,501 | B2* | 7/2008 | Szeto et al. | 709/206 |
| 2002/0173308 | A1 | 11/2002 | Dorenbosch et al. | |
| 2003/0043186 | A1 | 3/2003 | Libman | |
| 2003/0229722 | A1* | 12/2003 | Beyda | 709/310 |
| 2004/0158610 | A1 | 8/2004 | Davis et al. | |
| 2004/0215731 | A1 | 10/2004 | Tzann-en | |
| 2005/0138002 | A1 | 6/2005 | Giacobbe et al. | |
| 2005/0235034 | A1 | 10/2005 | Chen et al. | |
| 2006/0167849 | A1* | 7/2006 | Marcus et al. | 707/3 |
| 2006/0168037 | A1* | 7/2006 | Audu et al. | 709/206 |
| 2007/0076751 | A1* | 4/2007 | Garcia-Martin et al. | 370/466 |
| 2007/0143417 | A1* | 6/2007 | Daigle | 709/206 |
| 2008/0263167 | A1* | 10/2008 | Jennings et al. | 709/206 |

OTHER PUBLICATIONS

AOL, inc. "AIM 2.0 for Palm i705 User Guide"; copyright 2003; retrieved via website http://www.aim.com/help_faq/palm/userguide.adp on Dec. 29, 2009; pp. 1-9.*

* cited by examiner

*Primary Examiner*—Yemane Mesfin
*Assistant Examiner*—Thomas Richardson
(74) *Attorney, Agent, or Firm*—Schmeiser, Olsen & Watts; William E. Schiesser (57) ABSTRACT

A method and system for redisplaying or re-presenting an instant message. An instant message is received at a client and stored in a repository. The instant message is displayed in a first window which is provided by the client, and which is viewable by a user of the client. Alternatively, the message is converted to another format (e.g., speech) capable of being comprehended by the user via a non-visual sense, and presented to the user. The message is identified as being unread (or not comprehended) by the user based on pre-defined criteria. Detection of a pre-defined action prompts a search of the repository for any message identified as unread (or not comprehended). The message is located in the repository based on the search. Automatically, the message is redisplayed in a second window viewable by the user, or the message is re-presented to the user.

18 Claims, 7 Drawing Sheets

METHOD AND SYSTEM FOR IDENTIFYING AND AUTOMATICALLY REDISPLAYING UNREAD INSTANT MESSAGES

TECHNICAL FIELD

The present invention relates to a method and system for identifying an instant message that is designated as being unread by a user, and automatically redisplaying the identified message via the user's instant message client application.

BACKGROUND OF THE INVENTION

Under certain conditions, a user who is the intended recipient of an instant message does not read an instant message even though the message is received by the user's instant message client. For example, a window for displaying the instant message may not be displayed long enough to allow adequate time for reading the message if there is an untimely (1) closing of the window, (2) exiting or crashing of the instant message client, (2) crashing of the operating system of the user's computing device, or (3) powering down of the user's computing device. Conventionally, the user receives no assistance from the instant message client in identifying the instant message as being unread under the aforementioned conditions. Further, known techniques for recovering such an unread message include a time-consuming and predominantly manual search of log files based on timestamps. Thus, there exists a need to overcome at least one of the preceding deficiencies and limitations of the related art.

SUMMARY OF THE INVENTION

In first embodiments, the present invention provides a method of redisplaying an instant message in a computing environment, the method comprising:

receiving an instant message at an instant message (IM) client application;

storing the instant message in a data repository;

displaying the instant message or a notification of the instant message in a first window, the first window capable of being viewed by a user of the IM client application, the first window provided by the IM client application;

identifying the instant message as being unread by the user based on pre-defined criteria;

detecting a pre-defined action, the pre-defined action prompting a search of the data repository for any instant message identified as unread by the user via the identifying;

locating the instant message in the data repository based on the search; and automatically redisplaying the instant message or the notification of the instant message in a second window provided by the IM client application and viewable by the user, the automatically redisplaying performed in response to the identifying, the detecting and the locating.

A system, computer program product, and process for supporting computing infrastructure corresponding to the above-summarized method are also described and claimed herein.

In second embodiments, the present invention provides a computer-implemented method of re-presenting an instant message, the method comprising:

receiving an instant message at an instant message (IM) client application;

storing the instant message in a data repository;

converting the instant message to a converted instant message in a format capable of being comprehended by a user of the IM client application via a non-visual sense of the user;

presenting the converted instant message to the user via the IM client application;

identifying the instant message as being not comprehended by the user based on pre-defined criteria;

detecting a pre-defined action, the pre-defined action prompting a search of the data repository for any instant message identified as being not comprehended by the user via the identifying;

locating the instant message in the data repository based on the search; and automatically re-presenting the converted instant message to the user via the IM client application in response to the locating.

Advantageously, the present invention improves the reliability of an instant messaging architecture by providing a technique for identifying instant messages that were probably unread by a user, and redisplaying them to the user.

BEST MODE FOR CARRYING OUT THE INVENTION

Overview

The present invention provides a technique for identifying an instant message that was delivered to an instant message (IM) client application, but was unread by a user who utilizes the IM client application, and who is the intended recipient of the message. As used herein, an unread instant message is defined as an instant message that is determined to be probably not read or probably not completely read by a user by determining that a time period during which the message was displayed to the user was not adequate for the user to read or completely read the message based on pre-defined criteria. For example, a chat window that includes an instant message may be closed prematurely by the user or the IM client application may be terminated in an untimely manner (e.g., the IM client application crashes), thereby causing the user to miss reading the instant message. The present invention provides for a redisplay of the unread instant message in response to detecting pre-defined conditions (e.g., a premature closure of a window that includes the instant message, or a restart of the IM client application after a crash of the IM client application).

The present invention also provides similar features for implementations that convert instant messages to a speech or another format that is capable of being perceived or comprehended by the user via a non-visual sense of the user. Hereinafter, the instant message in this speech or other format is referred to as the converted instant message. In these implementations, an instant message is received at an IM client application and stored in a data repository. The instant message is transformed into the converted instant message and is presented to the user via the IM client application. The present invention identifies an instant message presented to the user as being not heard or otherwise not comprehended by the user (e.g., the instant message was muted prematurely), based on pre-defined criteria. For example, a presentation of a speech version of the instant message is initiated at an audible volume, but the user mutes the volume within a time period that is less than a pre-defined threshold value (i.e., the user muted the volume too quickly according to the pre-defined threshold), or an IM client application crash occurs within a time period that is less than the pre-defined threshold value. The present invention detects a pre-defined action (e.g., restart of the IM client application after a crash) that prompts a search of the data repository for messages that are identified as not having been comprehended by the user. The message that was identified as being not comprehended is located in the data repository based on the search. In response to the message being located, the present invention provides for the re-presentation of the converted instant message to the user via the IM client application.

Message Redisplay Systems

Figure 1A:
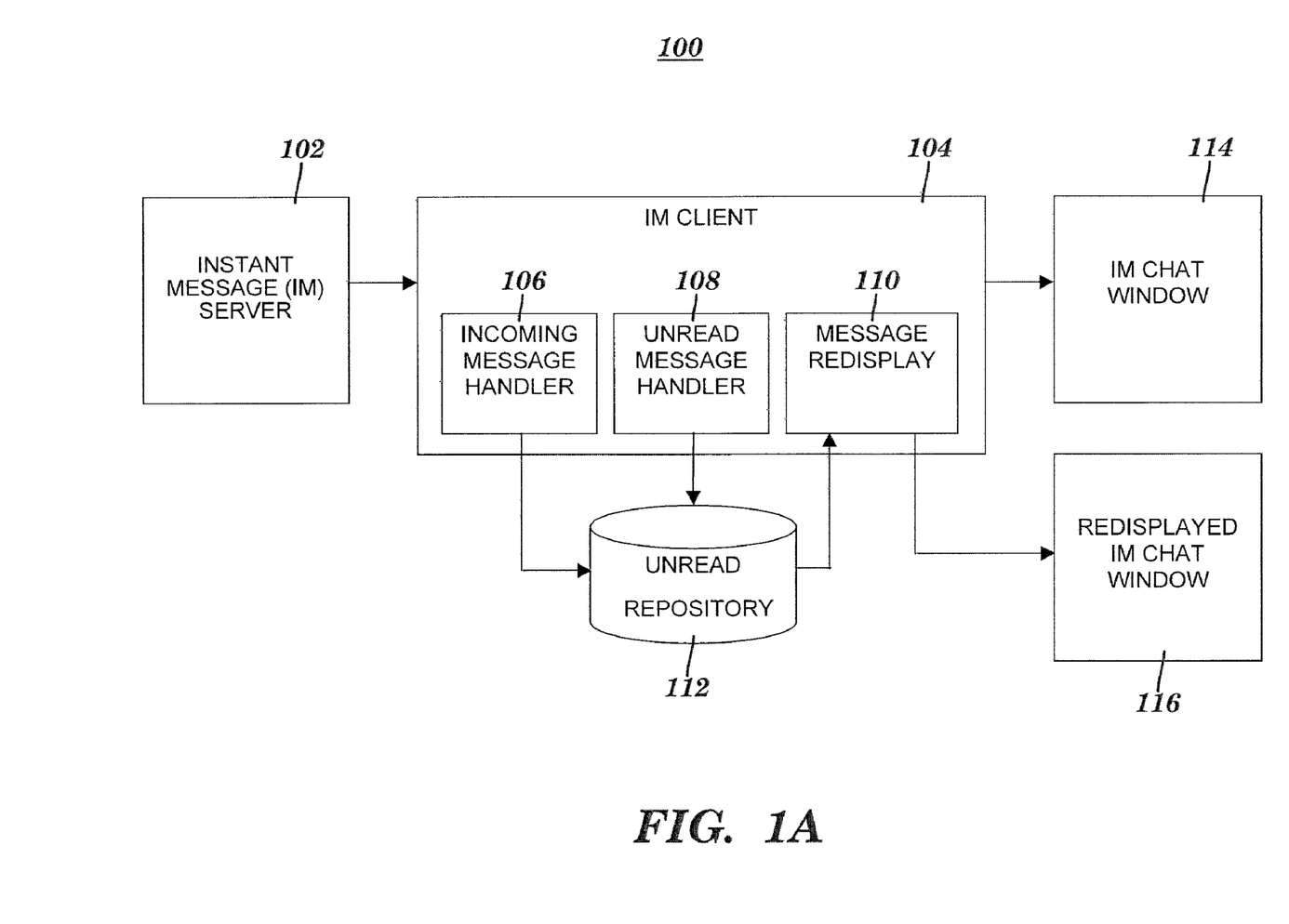
FIG. 1A is a block diagram of a first system for identifying and automatically redisplaying unread instant messages, in accordance with embodiments of the present invention.

FIG. 1A is a block diagram of a first system for identifying and automatically redisplaying unread instant messages, in accordance with embodiments of the present invention. Hereinafter, the system of FIG. 1A is also referred to as the first embodiment. A system 100 provides an instant messaging service and includes an instant message (IM) server 102 running an IM server application and an IM client 104 running an IM client application. An instant message received at IM server 102 from another client (not shown) is transmitted to and received by IM client 104, which is utilized by a user who is the intended recipient of the instant message. Hereinafter, the intended recipient of the instant message is also simply referred to as the user. IM server 102 receives the instant message from the other client, and transmits the message to IM client 104 via a network (not shown). Components of the IM client application residing on IM client 104 include an incoming message handler 106, an unread message handler 108 and a message redisplay component 110. Incoming message handler 106 of the IM client application stores the instant message received from IM server 102 in a data repository 112. Data repository 112 is also referred to as the unread repository, as it stores instant messages considered to be unread by the users who are their intended recipients. Data repository 112 is, for example, a database that includes instant messages in data records in XML format, and is stored in a storage unit employing non-volatile memory. The storage unit storing repository 112 is coupled to IM client 104.

The IM client application initiates a display of an instant message received by the IM client application. A window 114 (a.k.a. chat window) provided by the IM client application is provided to display the instant message. This display of the instant message includes either (1) displaying window 114 with the instant message included as part of the contents of window 114, or (2) displaying a notification included in window 114 that does not include the instant message, and optionally providing a selectable portion of a screen display (e.g., an icon) that is capable of being selected by the user to display chat window 114 with the instant message included therein. As used herein, a window is defined as a bounded section of a display presented by a computing device running the IM client application, where the bounded section and its contents are capable of being viewed by a user of the computing device. A window and its contents may be visible to the user or hidden from the user's view due to the placement of one or more other elements of the display. If the window is initially visible to the user of the computing device, the user may view the window and its contents by viewing the display. If the window is initially hidden from the user's view, the user may view the window by performing an action (e.g., activating an onscreen icon or pressing a combination of keys on a keyboard) that transforms the window from being hidden to being visible to the user.

Certain pre-defined conditions determine if the delivered instant message is unread by the user. The aforementioned conditions include: (1) IM chat window 114 is displayed in view of the user, but the intended recipient closes window 114 in a time period that does not provide adequate time for the user to read the message; (2) as the IM client application is in the process of exiting, the instant message is received by the IM client application prior to closure of a server thread servicing the IM client application, but window 114 is not in view of the user for a time period that is adequate for the user to read the message; and (3) the IM client application crashes, the operating system of a computing device that is running the IM client application crashes, or the computing device is powered down after the instant message is received by the IM client application and delivered for display in IM chat window 114, but prior to the intended recipient viewing a display of the instant message in window 114.

Unread message handler 108 queries (i.e., reads, updates, and deletes) data records in data repository 112 to identify instant messages that are considered to have been unread or read by the intended recipient according to pre-defined criteria discussed below relative to FIGS. 3A and 3B. In response to the processing of unread message handler 108, only instant messages that are considered unread by their intended recipients remain in repository 112. Upon the detection of a pre-defined action, message redisplay 110 locates and retrieves one or more unread instant messages from repository 112 and delivers them for redisplay in redisplayed IM chat window 116, which is provided by the IM client application. The one or more unread instant messages are then automatically redisplayed in window 116, which is viewable by the user. Redisplayed IM chat window 116 includes an identification of the one or more redisplayed messages as messages that were previously delivered (i.e., for display to the user in window 114), but were unread by the user.

Figure 1B:
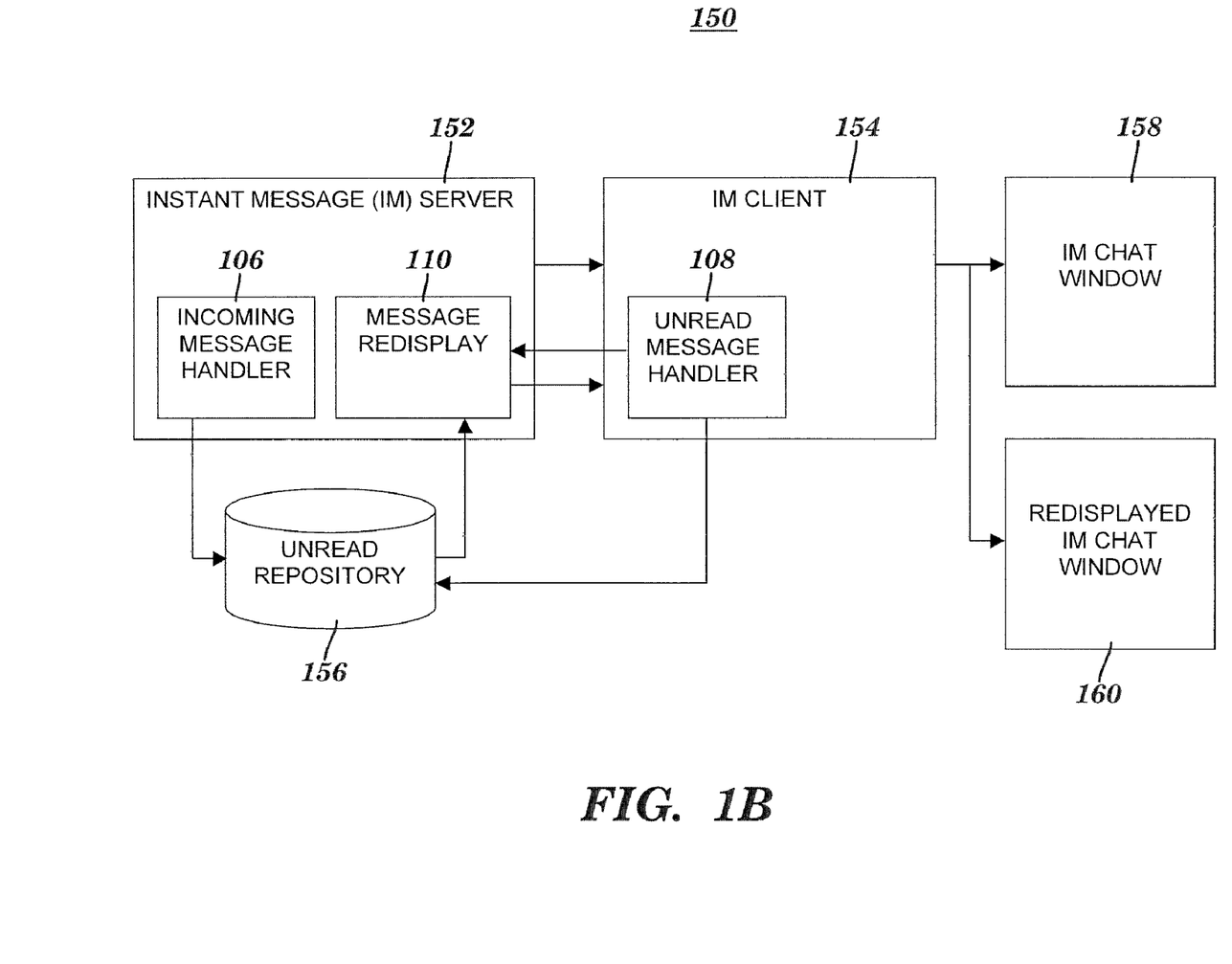
FIG. 1B is a block diagram of a second system for identifying and automatically redisplaying unread instant messages, in accordance with embodiments of the present invention.

FIG. 1B is a block diagram of a second system for identifying and automatically redisplaying unread instant messages, in accordance with embodiments of the present invention. Hereinafter, the system of FIG. 1B is also referred to as the second embodiment. Similar to system 100 (see FIG. 1A), an instant messaging system 150 includes an IM server 152 running an IM server application, an IM client 154 running an IM client application, an unread repository 156, an IM chat window 158 and a redisplayed IM chat window 160. Like system 100 (see FIG. 1A), an unread message handler 108 is a component of the IM client application. Unlike system 100 (see FIG. 1A), an incoming message handler 106 and a message redisplay 110 are components of an IM server application instead of in the IM client application. Further, system 150 differs from system 100 of FIG. 1A in that unread repository 156 is coupled to IM server 152 instead of to the IM client. Since unread repository 156 is coupled to the IM server, it will be understood by those skilled in the art that the querying by unread message handler 108 in FIG. 1B (indicated by the arrow from unread message handler 108 to unread repository 156) is brokered by IM server 152.

Each of the two embodiments of FIGS. 1A and 1B has its own advantages. The first embodiment of FIG. 1A triggers fewer events than the second embodiment of FIG. 1B, and is therefore a more reliable system with less network traffic. The second embodiment, however, allows a user to have unread messages redisplayed upon signing onto an IM client application installed on any one of multiple client computing devices, whereas the first embodiment is limited to redisplay upon signing onto the same client device that initially received the instant message. Further, the second embodiment allows the originator of the instant message to be notified by IM server 152 that the intended recipient probably did or probably did not read the message based on the pre-defined conditions described above relative to FIG. 1A. In one example, the second embodiment includes a privacy option that allows the user who is the intended recipient to specify whether or not the originator will receive information regarding the intended recipient's probable reading or non-reading of the instant message.

Incoming Message Handler

Figure 2:
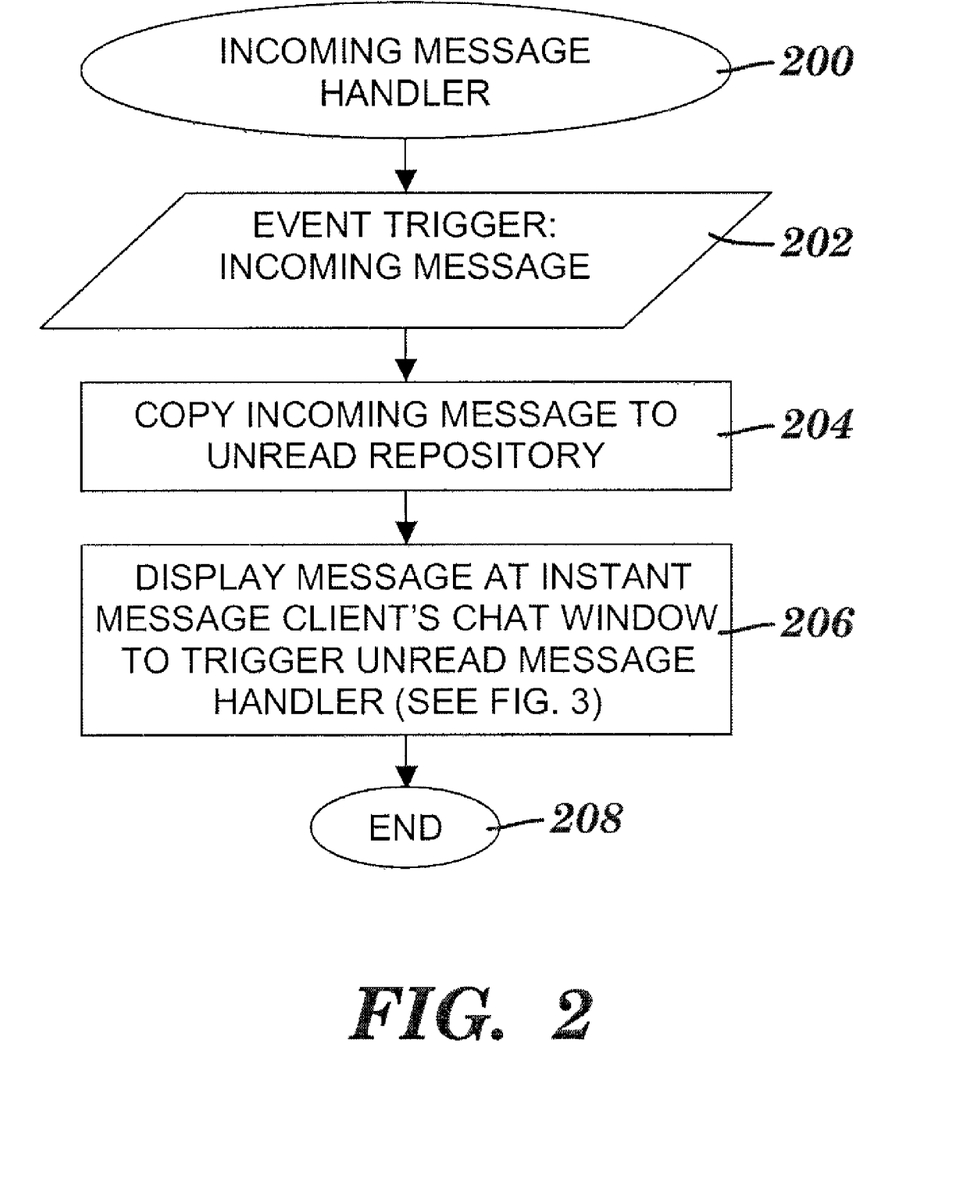
FIG. 2 is a flow chart of a process for handling an incoming message in the system of FIG. 1A or FIG. 1B, in accordance with embodiments of the present invention.

FIG. 2 is a flow chart of an incoming instant message handler process in the system of FIG. 1A or FIG. 1B in accordance with embodiments of the present invention. The incoming message handler process begins at step 200 and its event trigger 202 is the incoming instant message received by IM client 104 from IM server 102 in the first embodiment (see FIG. 1A), or received by IM server 152 in the second embodiment (see FIG. 1B). In step 204, incoming message handler 106 (see FIG. 1A or 1B) copies the incoming instant message into unread repository 112 (see FIG. 1A) in the first embodiment or unread repository 156 (see FIG. 1B) in the second embodiment. In step 206, the instant message or a notification of the instant message is displayed in IM chat window 114 (see FIG. 1A) in the first embodiment or IM chat window 158 (see FIG. 1B) in the second embodiment. Step 206 triggers the unread message handler, which is described below relative to FIGS. 3A-3B. As used herein, displaying an instant message or a notification of an instant message in a window is defined as including the instant message or notification in a window that is (1) visible to a user or (2) hidden from the user's view, but is capable of becoming visible to the user via an action by the user (e.g., pressing a key combination or activating an icon).

Unread Message Handler

Figure 3A:
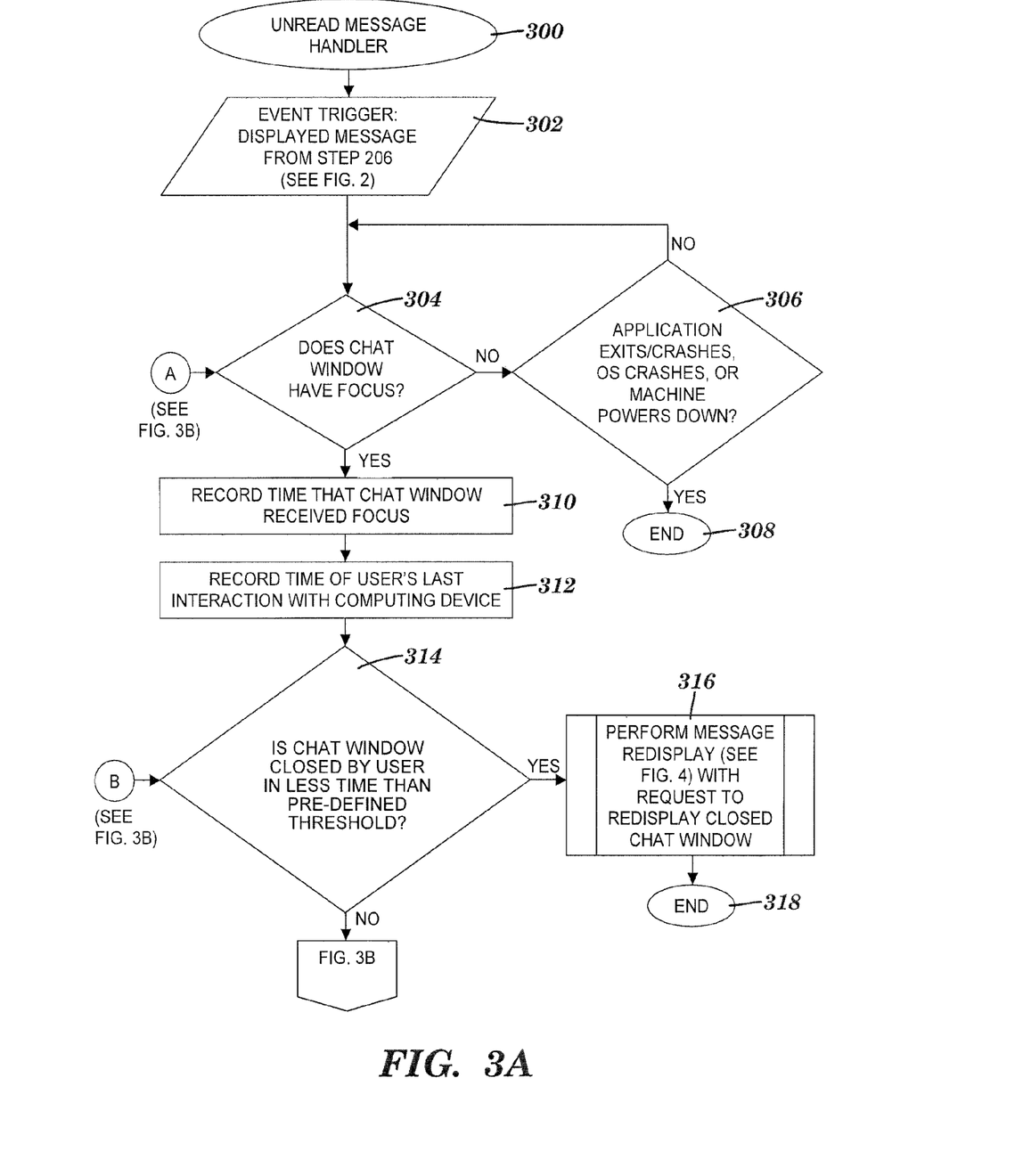
FIGS. 3A-3B depict a flow chart of a process for handling an unread message in the system of FIG. 1A or FIG. 1B, in accordance with embodiments of the present invention.
Figure 3B:
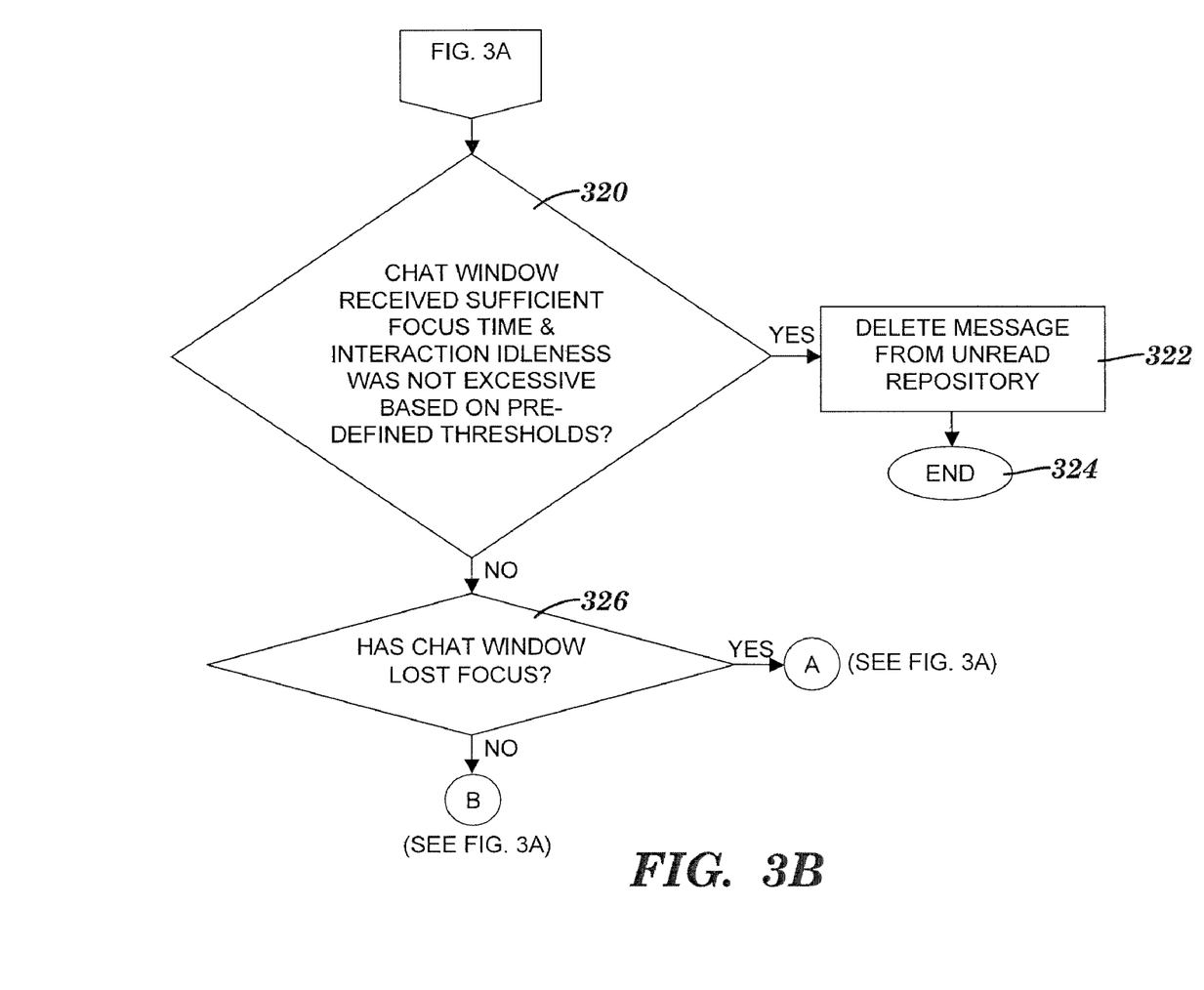

FIGS. 3A-3B depict a flow chart of a process for handling an unread message in the system of FIG. 1A or FIG. 1B, in accordance with embodiments of the present invention. The unread message handler process begins at step 300, and its event trigger 302 is the instant message being displayed in the incoming message handler process at step 206 (see FIG. 2). Inquiry 304 determines if the chat window in which the instant message is displayed has obtained focus. As used herein, a chat window obtaining focus is defined as a chat window attaining a state wherein the window and the instant message the window includes are perceivable by a user who is utilizing an IM client application that is processing the instant message (i.e., the window and its contents are not concealed from the user's perception). A window can obtain focus via an action by the IM client application or by the user of the IM client application. A window that has obtained focus is referred to herein as a window "having focus" or a window that "has focus." In one embodiment, a chat window having focus is a window whose instant message is visible to a user who is utilizing an IM client application that is processing the instant message, where the user is viewing a display device coupled to a computing device that is executing the IM client application. In this embodiment, a window that has focus includes an instant message that is not hidden from the user's view by being behind another window, or behind a logout screen or other dialog box. Further, in this embodiment, the visibility of the instant message to the user is in response to the user being present at the computing device and viewing the display device, and is not in response to any other interaction (e.g., pressing a key combination) of the user with the IM client application. In a text-to-speech implementation, a chat window having focus is a window whose text version of the instant message has been converted to speech that is audible to the user. Such speech being audible to the user means, for example, that the speech version of the instant message is not paused and the volume is not muted.

If step 304 determines that the chat window does not have focus, inquiry 306 determines if an externally initiated event terminates the unread message handler process. In one embodiment, inquiry 306 determines if any of the following events occur before the chat window attains focus: (1) the IM client application exits, (2) the IM client application crashes, (3) the operating system (OS) crashes (i.e., the OS of the computing device that is running the IM client application crashes), or (4) the computing device running the IM client application powers down. If inquiry 306 determines that none of the aforementioned events (1)-(4) occurs, then the process loops back to step 304. If inquiry 306 determines that one of the events (1)-(4) occurs before the chat window attains focus, then the unread message handler process ends at step 308. In the step 308 exit of the FIG. 3A process, the instant message remains in the unread repository, which will signify that the instant message requires a redisplay upon the next start of the IM client application (see the event trigger of FIG. 4).

Returning to inquiry 304, if the chat window does have focus, the time that the chat window received focus is recorded in memory in step 310. The memory is coupled to a computing device that executes the IM client application. The time of the user's last interaction with the computing device running the IM client application is recorded in memory in step 312. Interaction with the computing device is determined by detecting a key press on a keyboard, pointing device movement, a voice command, facial recognition via a camera, and any other known manner of detecting the user's presence. Inquiry 314 determines if the chat window has been closed so quickly that the user did not have adequate time to read the instant message in the chat window, where the adequacy of the time to read the message is based on a pre-defined threshold value. In one embodiment, inquiry 314 determines if the chat window is closed by the user in a time period that is less than a pre-defined threshold value (a.k.a. focus time threshold). In inquiry 314, the time period being compared to the pre-defined threshold value starts at the time the chat window gains focus. The pre-defined threshold value is, for example, a user-defined value, or a value set by the IM client application. In one embodiment, a default value is set for the pre-defined threshold value and limits are set on the values that a user can supply for the threshold value. Closure of the chat window can be performed by, for example, clicking a window close button (e.g., a button with an X icon), pressing the Escape key, or using a keyboard combination to close a window (e.g., pressing Alt-W, Alt-F4 or Ctrl-W).

In an alternate embodiment, inquiry 314 determines if the chat window was closed before the user could read the entire instant message based on estimated value(s) of the user's reading speed and the amount of text included in the instant message displayed in the chat window. For example, an estimate of reading speed can be obtained from (1) the user inputting a reading speed (e.g., in words per minute); (2) an automated reading test provided by the IM client application during setup or configuration (e.g., the application presents sample text, the user clicks a button to indicate when reading starts, the user clicks a button to indicate when reading ends, and the application computes the reading time and rate); or (3) one or more application-specified default values based on, for instance, the reading speed of an average person for various numbers of words or characters. For example, default reading speeds for a user are 1-10 characters read in two seconds, 11-30 characters read in 5 seconds, etc., and a first instant message is delivered that includes 15 characters. In this example, the focus time threshold in inquiry 314 for the first instant message is set to 5 seconds. Continuing this example, a second instant message is delivered that includes only two characters. Thus, the focus time threshold in inquiry 314 for the second instant message is set to two seconds.

If inquiry 314 determines that the chat window was closed too quickly for the user to read the instant message, then step 316 generates a request to redisplay the prematurely closed chat window by performing the message redisplay process (see FIG. 4), and the unread message handler process ends at step 318.

If inquiry 314 determines that the chat window had focus for a time period that was adequate for the user to read the instant message, then the unread message handler process continues in FIG. 3B with inquiry 320. Inquiry 320 determines if the instant message is considered to be read based on pre-defined conditions. In one embodiment, the pre-defined conditions are: (a) the chat window received adequate focus time for the user to read the instant message based on the pre-defined threshold value in step 314, and (b) the interaction idleness of the user was not excessive based on a pre-defined threshold value (a.k.a. interaction idleness threshold). The focus time in condition (a) is the duration from the time the chat window attained focus to the time that inquiry 320 is being evaluated. As used herein, interaction idleness of the user is defined to be the time period between the current time and the time recorded in step 312. As an example, the aforementioned condition (b) is true if the interaction idleness does not exceed the interaction idleness threshold.

The conditions of inquiry 320 are not evaluated until either (1) the user is idle for a time period greater than or equal to the pre-defined threshold value for interaction idleness, or (2) there is a subsequent interaction with the computing device after the interaction time recorded in step 312. If the aforementioned conditions (a) and (b) are evaluated as true, then the instant message is considered to be read.

As an alternative to inquiry 320, the instant message is considered to be read in response to the user performing a precise action (e.g., activating a button on a graphical user interface) to indicate that the instant message has actually been read.

If the instant message is considered read, step 322 deletes the instant message from the local unread repository in the first embodiment (see FIG. 1A) or sends a request to delete the instant message to the remote unread repository in the second embodiment (see FIG. 1B). In the second embodiment, step 322 can optionally send, subject to a privacy preference defined by the recipient user, a notification to the originator of the instant message that the message has probably been read by the user. After the message is considered read and the instant message is deleted from the unread repository, the unread message handler process ends at step 324.

The pre-defined thresholds of the aforementioned conditions (a) and (b) are, for example, defined by the user, or specified by the IM client application. In one embodiment, the IM client application specifies default values for the pre-defined thresholds and sets limits on the values that can be supplied by the user for the pre-defined thresholds. Five minutes is one example of a default value for the interaction idleness threshold.

Returning to inquiry 320, if the instant message is not considered to be read by the pre-defined conditions (e.g., one or both of pre-defined conditions (a) and (b) are false), then inquiry 326 determines if the chat window has lost focus. If the chat window has lost focus, then the process repeats steps starting at step 304. On the other hand, if the chat window has not lost focus in inquiry 326, then the process repeats steps starting at step 314. Loss of focus detected in step 326 occurs via an action by the user or via a process external to the user. Examples of loss of focus due to a user action include the user (1) minimizing the chat window, (2) selecting a different window to gain focus (e.g., pressing Alt-Tab), and (3) launching a new window or process (e.g., selecting a different window from a task list). An example of loss of focus due to an external process is the configuration of the IM client application providing an automatic display of any new chat conversation in a new chat window that takes focus from the previous chat window.

The actions that terminate the IM client application relative to inquiry 306 can also occur at other times during the unread message handler process. If such terminating actions occur before the instant message is deleted from the unread repository in step 322, then the instant message is considered to be unread and a redisplay of the message is triggered in the message redisplay process of FIG. 4.

EXAMPLES

In the following examples of the unread message handler process, the focus time threshold for the chat window is 4 seconds and the interaction idleness threshold is 5 minutes.

In a first example, an instant message is delivered to a chat window, thereby triggering the event in step 302. In this example, the chat window is automatically given focus by the IM client application at time T. The time the chat window received focus (i.e., time T) is recorded in step 310, and the time of the user's last interaction with the computing device running the IM client application is recorded in step 312. In this example, the user is in the process of closing various windows as the instant message is being delivered, and accidentally closes the chat window at time T+0.1 seconds, before having a chance to read the instant message in the chat window. Since the user closed the chat window in a time period (i.e., (T+0.1 seconds)–T, or 0.1 seconds) that is less than the focus time threshold of 4 seconds, the process follows the Yes branch of inquiry 314 (i.e., the instant message is considered unread and in need of redisplay). Step 316 requests a redisplay of the instant message included in the chat window that was prematurely closed. The instant message is then redisplayed according to the process described below relative to FIG. 4.

In a second example, a user temporarily leaves the computing device that is running the IM client application at time T. The user will be away from the computing device for 10 minutes. Time T–1 minute was the time of the user's last interaction with the computing device. At time T+2 minutes, an instant message is displayed in the chat window that has focus. The process flows to the Yes branch from inquiry 304. Focus time (i.e., T+2 minutes) and the last user interaction time (i.e., T−1 minute) are recorded in steps 310 and 312, respectively. The process flows via the No branch from inquiry 314 because the user is not present to close the chat window. At time T+4 minutes (i.e., at the duration of the interaction idleness threshold, which is 5 minutes after the time of the last user interaction), the chat window still has focus, and inquiry 320 is ready to be evaluated. At time T+4 minutes, the chat window has had (T+4 minutes)−(T+2 minutes), or 2 minutes of focus time, which is sufficient for the user to have read the instant message (i.e., 2 minutes is greater than or equal to the focus time threshold of 4 seconds). Since at time T+4 minutes, the interaction idleness time is (T+4 minutes)−(T−1 minute), or 5 minutes, the interaction idleness is excessive (i.e., 5 minutes is greater than or equal to the interaction idleness threshold of 5 minutes), thereby indicating that the user is likely to be absent from the computing device that is executing the IM client application. The excessive interaction idleness and the continued focus of the chat window cause the process to flow via the No branches of inquiries 320 and 326, thereby returning to inquiry 314. This loop from step 314 to step 326 continues until the user returns at time T+10 minutes.

Upon returning to the computing device, the user moves a mouse pointing device at time T+10 minutes, and closes the chat window at time T+11 minutes. At inquiry 314, the period between the chat window's time of gaining focus and its closing (i.e., (T+11 minutes)−(T+2 minutes) or 9 minutes) is greater than the focus time threshold (i.e., 9 minutes>the 4 second focus time threshold). Therefore, the No branch of inquiry 314 is taken to inquiry 320. Inquiry 320 can be evaluated because there were subsequent user interactions at times T+10 minutes and T+11 minutes. The idleness time is recomputed to be (T+11 minutes)−(T+10 minutes) or 1 minute, which is not excessive based on the 5 minute interaction idleness threshold (i.e., 1 minute<the 5 minute interaction idleness threshold). Again, the chat window has had sufficient focus time for the user to have read the instant message. Since the two conditions of inquiry 320 are true, the instant message is considered read and step 322 deletes the message from the unread repository.

In a third example, the events of the second example are followed up to and including the events that happen at time T+4 minutes. At time T+6 minutes the chat window loses focus due to a second instant message being displayed in another chat window that takes focus. Hereinafter, the chat window that loses focus in this example is referred to as the initial chat window. Since the initial chat window loses focus, inquiry 326 evaluates to Yes, and the process continues with inquiry step 304. Since the initial chat window does not have focus, the process follows the No branch of inquiry 304 to inquiry 306. In this example, the operating system of the computing device running the IM client application crashes at time T+8 minutes (i.e., prior to the user returning to the computing device and having an opportunity to redisplay the initial chat window and read the instant message). In response to the operating system crash, the process follows the Yes branch of inquiry 306. The unread message handler process then ends at step 308 with the instant message still considered as being unread because a copy of the instant message remains in the unread repository. After the operating system is running again, the IM client application is restarted. Upon restarting the IM client application, the message redisplay process (see FIG. 4) redisplays the previously unread instant message for viewing by the user.

Message Redisplay

Figure 4:
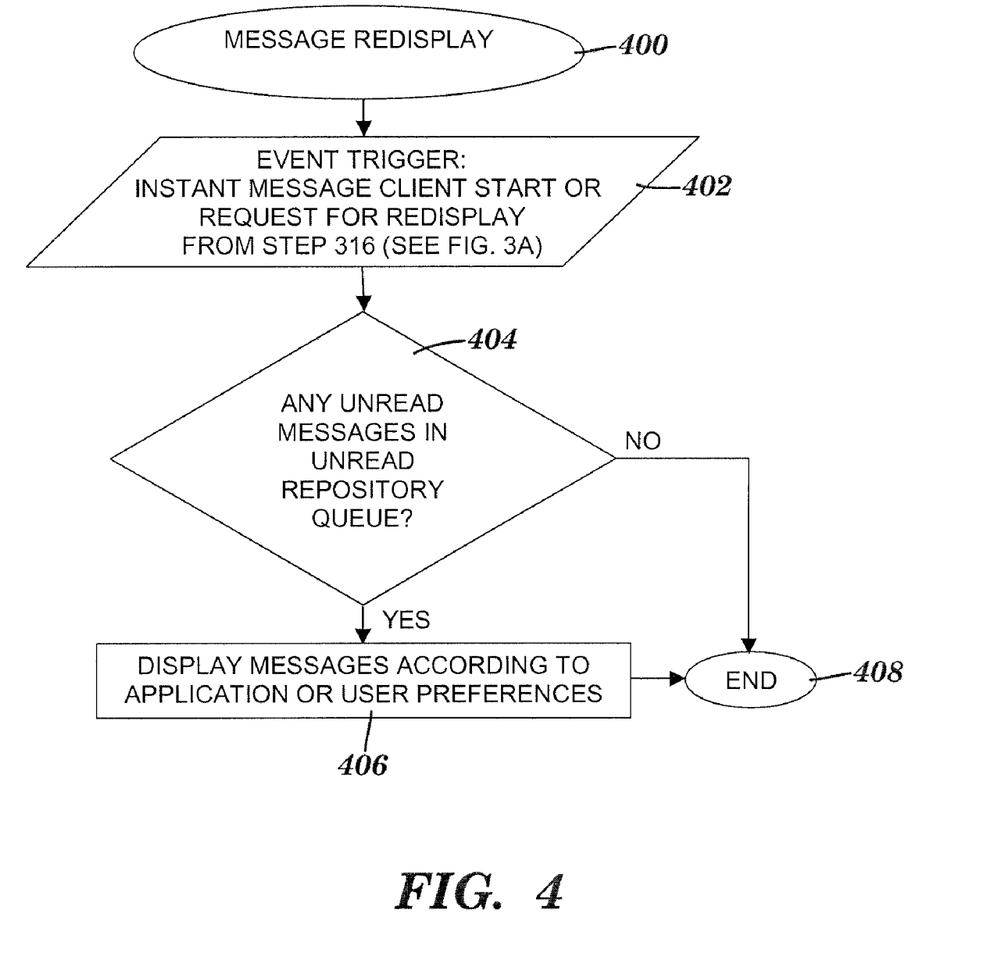
FIG. 4 is a flow chart of a process for redisplaying a message in the system of FIG. 1A or FIG. 1B, in accordance with embodiments of the present invention.

FIG. 4 is a flow chart of a process for redisplaying an instant message in the system of FIG. 1A or FIG. 1B, in accordance with embodiments of the present invention. The instant message redisplay process starts at step 400, and its event trigger is the start of the IM client application or the issuance of a request for an instant message redisplay from step 316 of FIG. 3A. Inquiry step 404 determines if there are any unread messages in a queue of unread repository 112 (see FIG. 1A) or unread repository 156 (see FIG. 1B). If one or more unread messages are in the unread repository queue, then the one or more unread messages are displayed in step 406 to the user according to preferences defined by the user or by the IM client application. In one embodiment, the redisplayed instant messages are displayed together with a designator that indicates that the messages are being redisplayed. For example, redisplayed messages can be displayed after text that appears in a distinctive font, typeface and/or color, where the text states that at least one message was received that appears to have not been read. As another example, text can be displayed inline with each redisplayed message, stating that the message on the same line is potentially unread. As an option, the redisplay of unread messages can include a button or link that can be activated to display additional information about the reason(s) each message is considered to be unread. Following step 406, or if inquiry 404 determines that there are no unread messages in the unread repository queue, the message redisplay process ends at step 408.

In one embodiment, step 406 is modified to display one or more notifications of the one or more unread messages, rather than the messages themselves. To display an unread message in this embodiment, the user activates an icon or other screen element associated with the notification of the unread message.

Although not shown in FIG. 4, a message redisplayed in step 406 is considered to be read by the user if pre-defined conditions are satisfied. In one embodiment, a redisplayed message is considered read in response to closing the window that includes the redisplayed message. In another embodiment, the redisplayed message is considered read in response to the user performing an action that designates the message as having been read (e.g., activating an onscreen button that marks the message as "read"). If the user marks the message as having been read, then the message is deleted from the unread repository; otherwise, the message is retained in the unread repository and is displayed again if the IM client application terminates (e.g., by an OS crash), and is restarted to again trigger the message redisplay process of FIG. 4.

Computing System

Figure 5:
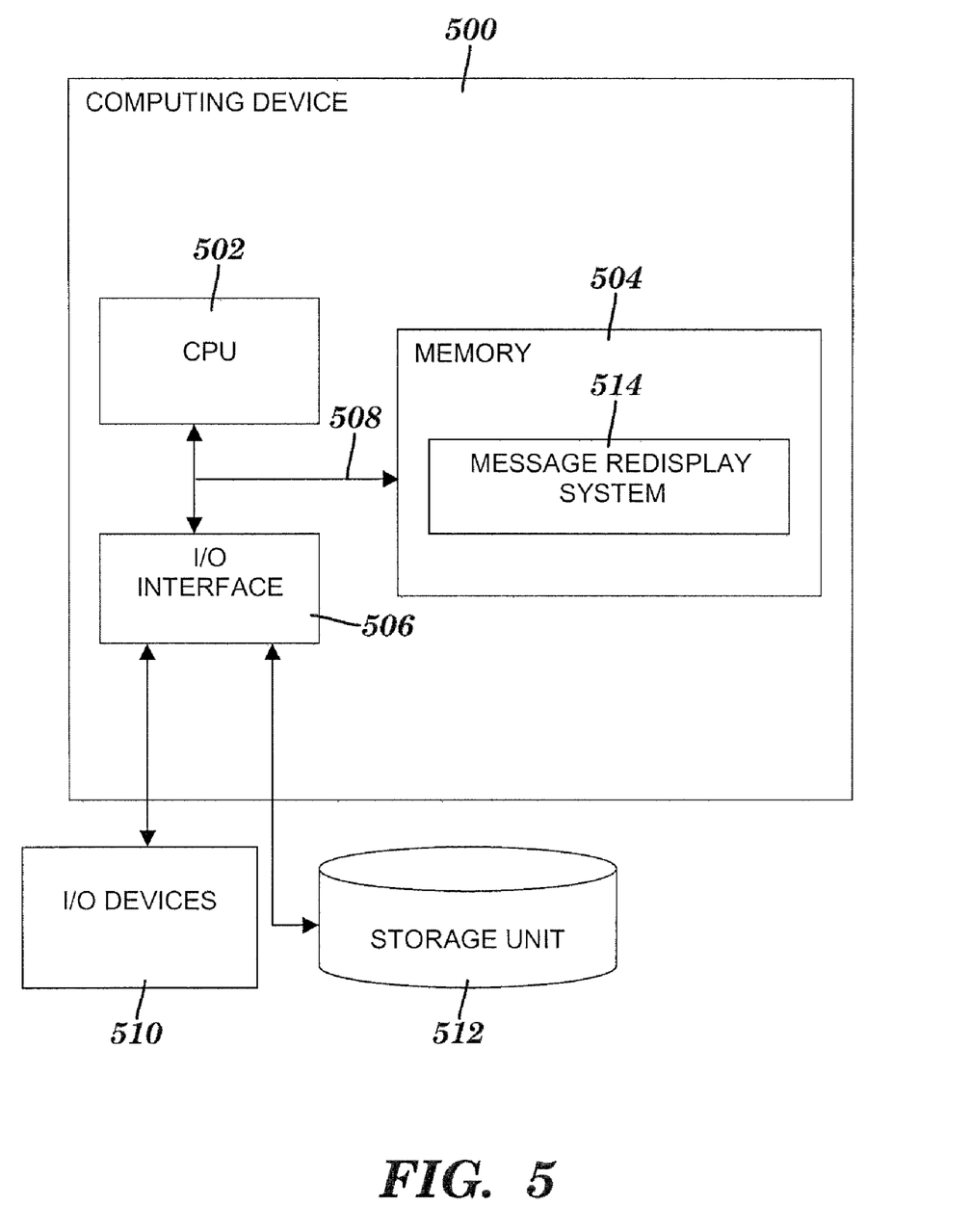
FIG. 5 is a block diagram of a computing device included in the system of FIG. 1A or FIG. 1B, and implementing the processes of FIGS. 2, 3A-3B and 4, in accordance with embodiments of the present invention.

FIG. 5 is a block diagram of a computing device 500 that is included in the system of FIG. 1A or FIG. 1B, and that implements the processes of FIGS. 2, 3A-3B and 4, in accordance with embodiments of the present invention. Computing device 500 generally comprises a central processing unit (CPU) 502, a memory 504, an input/output (I/O) interface 506, a bus 508, I/O devices 510 and a storage unit 512. CPU 502 performs computation and control functions of computing device 500. CPU 502 may comprise a single processing unit, or be distributed across one or more processing units in one or more locations (e.g., on a client and server).

Memory 504 may comprise any known type of data storage and/or transmission media, including magnetic media, optical media, random access memory (RAM), read-only memory (ROM), a data cache, a data object, etc. Local memory elements of memory 504 are employed during actual execution of message redisplay system 514. Cache memory elements of memory 504 provide temporary storage of at least some program code in order to reduce the number of times code must be retrieved from bulk storage during execution. Storage unit 512 is, for example, a magnetic disk drive or an optical disk drive that stores data such as the unread instant messages of repository 112 (see FIG. 1A) or repository 156 (see FIG. 1B). Moreover, similar to CPU 502, memory 504 may reside at a single physical location, comprising one or more types of data storage, or be distributed across a plurality of physical systems in various forms. Further, memory 504 can include data distributed across, for example, a LAN, WAN or storage area network (SAN) (not shown).

I/O interface 506 comprises any system for exchanging information to or from an external source. I/O devices 510 comprise any known type of external device, including a display monitor, keyboard, mouse, printer, speakers, handheld device, printer, facsimile, etc. Bus 508 provides a communication link between each of the components in computing device 500, and may comprise any type of transmission link, including electrical, optical, wireless, etc.

I/O interface 506 also allows computing device 500 to store and retrieve information (e.g., program instructions or data) from an auxiliary storage device, such as a non-volatile storage device (e.g., a CD-ROM drive which receives a CD-ROM disk) (not shown). Computing device 500 can store and retrieve information from other auxiliary storage devices (not shown), which can include a direct access storage device (DASD) (e.g., hard disk or floppy diskette), a magneto-optical disk drive, a tape drive, or a wireless communication device.

Memory 504 includes computer program code comprising message redisplay system 514 that implements the logic of the processes of FIGS. 2, 3A-3B and 4. Further, memory 504 may include other systems not shown in FIG. 5, such as an operating system (e.g., Linux) that runs on CPU 502 and provides control of various components within and/or connected to computing device 500.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 514 for use by or in connection with a computing device 500 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 504, ROM, a rigid magnetic disk and an optical disk. Current examples of optical disks include compact disk—read-only memory (CD-ROM), compact disk—read/write (CD-R/W) and DVD.

Any of the components of the present invention can be deployed, managed, serviced, etc. by a service provider that offers to deploy or integrate computing infrastructure with respect to the unread instant message identification and redisplay method of the present invention. Thus, the present invention discloses a process for supporting computer infrastructure, comprising integrating, hosting, maintaining and deploying computer-readable code into a computing system (e.g., computing device 500), wherein the code in combination with the computing system is capable of performing a method of identifying and redisplaying unread instant messages.

In another embodiment, the invention provides a business method that performs the process steps of the invention on a subscription, advertising and/or fee basis. That is, a service provider, such as a Solution Integrator, can offer to create, maintain, support, etc. an unread instant message identification and redisplay method of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of redisplaying an instant message in a computing environment, comprising:

receiving an instant message at an instant message (IM) client application;

storing said instant message in a data repository;

displaying said instant message or a notification of said instant message in a first window initially at a first time, said first window capable of being viewed by a user of said IM client application, said first window provided by said IM client application;

in response to said displaying said instant message or said notification, obtaining a focus by said first window at said first time, said focus being a visibility of contents of said first window to said user viewing a display device coupled to a computing system on which said IM client application is executing, wherein said visibility of said contents is in response to a viewing by said user of said display device and is not in response to any other interaction with said IM client application, and wherein said contents include said instant message or said notification;

closing said first window at a second time subsequent to said first time;

determining a time period as a difference between said first time and said second time, wherein said time period is a period of time during which said first window has said focus;

determining said time period is an amount of time that is insufficient for said user to read said instant message by determining said time period is less than a pre-defined threshold value, wherein said determining said time period is less than said pre-defined threshold value is based on a reading speed of said user and an amount of text included in said instant message;
wherein the reading speed of said user is obtained by an automated reading test provided by the IM client application during setup or configuration;
identifying said instant message as being unread by said user based on said time period being said amount of time that is insufficient for said user to read said instant message;
generating a request for redisplaying said instant message in response to said determining said time period is less than said pre-defined threshold value;
detecting a pre-defined action, said pre-defined action prompting a search of said data repository for any instant message identified as unread by said user via said identifying, wherein said detecting said pre-defined action comprises detecting said request;
locating said instant message in said data repository based on said search; and
automatically redisplaying said instant message or said notification of said instant message in a second window provided by said IM client application and viewable by said user, said automatically redisplaying performed by a processor of said computing system in response to said identifying, said detecting and said locating.

2. The method of claim 1, further comprising:
recording said first time in response to said obtaining said focus.

3. The method of claim 1, further comprising:
receiving a second instant message at said IM client application;
storing said second instant message in said data repository;
displaying said second instant message in said first window;
obtaining, in response to said displaying said second instant message, a focus by said first window at a first time, said focus being a visibility of contents of said first window to any user viewing a display associated with said IM client application, said contents including said second instant message;
recording said first time in response to said obtaining said focus;
recording a first interaction time, said first interaction time being a time of a first interaction by said user with said IM client application that is closest in time to and preceding said first time;
recording a second interaction time, said second interaction time being a time of a second interaction by said user with said IM client application that is subsequent to said first interaction with no other interactions by said user with said IM client application occurring between said first interaction and said second interaction;
computing an interaction idleness time, said interaction idleness time being a difference between said second interaction time and said first interaction time;
determining that said first time exceeds a pre-defined focus time threshold value and said interaction idleness time does not exceed a pre-defined interaction idleness threshold value;
identifying, in response to said determining, said second instant message as being read by said user;
deleting said second instant message from said data repository in response to said identifying said second instant message as being read,
wherein said deleting prevents said second instant message from being detected by said detecting.

4. The method of claim 1, wherein said storing and said locating are managed by said IM client application.

5. The method of claim 1, further comprising:
receiving said instant message at an IM server application that services requests from said IM client application;
searching, by said IM server application and in response to said detecting, said data repository for any instant message identified as unread by said user via said identifying; and
delivering said instant message from said IM server application to said IM client application,
wherein said storing and said locating are managed by said IM server application, and
wherein said receiving said instant message at said IM client application is performed in response to said delivering.

6. The method of claim 1, wherein said obtaining said focus includes obtaining said focus by said first window that includes said instant message that is not hidden from a view of said user by being behind another window, a logout screen, or a dialog box.

7. A computer system comprising a processor coupled to a computer-readable memory unit, said memory unit comprising a software application, said software application comprising instructions that when executed by said processor implement the method of claim 1.

8. A computer program product comprising a computer-readable storage medium having a computer-readable program code stored therein, said computer-readable program code containing instructions configured to be executed by a processor of a computing system to implement a method of redisplaying an instant message in a computing environment, said method comprising:
receiving an instant message at an instant message (IM) client application;
storing said instant message in a data repository;
displaying said instant message or a notification of said instant message in a first window initially at a first time, said first window capable of being viewed by a user of said IM client application, said first window provided by said IM client application;
in response to said displaying said instant message or said notification, obtaining a focus by said first window at said first time, said focus being a visibility of contents of said first window to said user viewing a display device coupled to a computing system on which said IM client application is executing, wherein said visibility of said contents is in response to a viewing by said user of said display device and is not in response to any other interaction with said IM client application, and wherein said contents include said instant message or said notification;
closing said first window at a second time subsequent to said first time;
determining a time period as a difference between said first time and said second time, wherein said time period is a period of time during which said first window has said focus;
determining said time period is an amount of time that is insufficient for said user to read said instant message by determining said time period is less than a pre-defined threshold value, wherein said determining said time period is less than said pre-defined threshold value is based on a reading speed of said user and an amount of text included in said instant message;

wherein the reading speed of said user is obtained by an automated reading test provided by the IM client application during setup or configuration;

identifying said instant message as being unread by said user based on said time period being said amount of time that is insufficient for said user to read said instant message;

generating a request for redisplaying said instant message in response to said determining said time period is less than said pre-defined threshold value;

detecting a pre-defined action, said pre-defined action prompting a search of said data repository for any instant message identified as unread by said user via said identifying, wherein said detecting said pre-defined action comprises detecting said request;

locating said instant message in said data repository based on said search; and automatically redisplaying said instant message or said notification of said instant message in a second window provided by said IM client application and viewable by said user, said automatically redisplaying performed in response to said identifying, said detecting and said locating.

9. The program product of claim 8, wherein said method further comprises:

recording said first time in response to said obtaining said focus.

10. A process for supporting computing infrastructure, said process comprising providing at least one support service for at least one of creating, integrating, hosting, maintaining, and deploying computer-readable code in a computing system, wherein said computer-readable code is stored in a computer-readable storage medium of said computing system, and wherein the code in combination with the computing system is capable of performing a method of redisplaying an instant message, said method comprising:

receiving an instant message at an instant message (IM) client application;

storing said instant message in a data repository;

displaying said instant message or a notification of said instant message in a first window initially at a first time, said first window capable of being viewed by a user of said IM client application, said first window provided by said IM client application;

in response to said displaying said instant message or said notification, obtaining a focus by said first window at said first time, said focus being a visibility of contents of said first window to said user viewing a display device coupled to a computing system on which said IM client application is executing, wherein said visibility of said contents is in response to a viewing by said user of said display device and is not in response to any other interaction with said IM client application, and wherein said contents include said instant message or said notification;

closing said first window at a second time subsequent to said first time;

determining a time period as a difference between said first time and said second time, wherein said time period is a period of time during which said first window has said focus;

determining said time period is an amount of time that is insufficient for said user to read said instant message by determining said time period is less than a pre-defined threshold value, wherein said determining said time period is less than said pre-defined threshold value is based on a reading speed of said user and an amount of text included in said instant message;

wherein the reading speed of said user is obtained by an automated reading test provided by the IM client application during setup or configuration;

identifying said instant message as being unread by said user based on said time period being said amount of time that is insufficient for said user to read said instant message;

generating a request for redisplaying said instant message in response to said determining said time period is less than said pre-defined threshold value;

detecting a pre-defined action, said pre-defined action prompting a search of said data repository for any instant message identified as unread by said user via said identifying, wherein said detecting said pre-defined action comprises detecting said request;

locating said instant message in said data repository based on said search; and automatically redisplaying said instant message or said notification of said instant message in a second window provided by said IM client application and viewable by said user, said automatically redisplaying performed by a processor of said computing system and in response to said identifying, said detecting and said locating.

11. The process of claim 10, wherein the method further comprises:

recording said first time in response to said obtaining said focus.

12. A method of redisplaying an instant message in a computing environment, comprising:

starting an instant message (IM) client application;

receiving an instant message at said IM client application;

storing said instant message in a data repository, wherein said data repository consists of one or more instant messages unread by a user of said IM client application;

displaying said instant message or a notification of said instant message in a first window provided by said IM client application;

determining said first window does not have a focus for a pre-determined time period, said focus being a visibility of contents of said first window to said user viewing a display device coupled to a computing system on which said IM client application is executing, wherein said visibility of said contents is based on said user viewing said display device and is not in response to any other interaction with said IM client application, and wherein said contents include said instant message or said notification;

determining said time period is an amount of time that is insufficient for said user to read said instant message by determining said time period is less than a pre-defined threshold value, wherein said determining said time period is less than said pre-defined threshold value is based on a reading speed of said user and an amount of text included in said instant message;

wherein the reading speed of said user is obtained by an automated reading test provided by the IM client application during setup or configuration;

subsequent to said determining said first window does not have said focus for said pre-determined time period, terminating said IM client application as a result of a pre-defined event, wherein a result of said terminating said IM client application is said instant message remaining in said data repository, wherein said pre-defined event is a crash of said IM client application or a crash of an operating system of said computing system;

restarting said IM client application subsequent to said terminating said IM client application;

in response to said restarting said IM client application, searching said data repository for any instant message that is unread by said user and retrieving said instant message from said data repository; and in response to said restarting said IM client application, automatically redisplaying said instant message or said notification of said instant message in a second window provided by said IM client application and viewable by said user, wherein said automatically redisplaying is performed by a processor of said computing system.

13. The method of claim 12, further comprising:

in response to said displaying said instant message or said notification, obtaining a focus by said first window at a first time, recording said first time in response to said obtaining said focus;

recording a first interaction time, said first interaction time being a time of an interaction by said user with said IM client application that is closest in time to and preceding said first time of said focus;

determining said first window is not closed by said user within a time period that is less than a pre-defined focus time threshold value, wherein said time period is a period of time starting at said first time and during which said first window has said focus;

determining an interaction idleness time as a difference between a current time and said first interaction time;

detecting a second interaction time subsequent to said first interaction time or that said interaction idleness time exceeds a pre-defined interaction idleness threshold value;

in response to said detecting said second interaction time or that said interaction idleness time exceeds said pre-defined interaction idleness threshold value, determining a pre-defined condition exists, wherein said pre-defined condition is selected from the group consisting of said first window has said focus for a period of time that is less than said pre-defined focus time threshold value, said interaction idleness time exceeds said pre-defined interaction idleness threshold value, and a combination thereof;

in response to said determining said pre-defined condition exists, identifying said instant message as being unread by said user;

subsequent to said determining said pre-defined condition exists, detecting a loss of said focus by said first window, wherein said determining said first window does not have said focus is performed in response to said detecting said loss of said focus.

14. The method of claim 13, further comprising losing said focus by said first window by minimizing said first window, selecting a window other than said first window to gain said focus, launching a new window, or launching a new process, wherein said detecting said loss of said focus by said first window is performed in response to said losing said focus.

15. The method of claim 13, further comprising:

a process external to said user automatically displaying a new window that includes a new instant message; and in response to said automatically displaying said new window, losing said focus by said first window, wherein said detecting said loss of said focus by said first window is performed in response to said losing said focus.

16. A computer system comprising a processor coupled to a computer-readable memory unit, said memory unit comprising a software application, said software application comprising instructions that when executed by said processor implement the method of claim 12.

17. A computer program product, comprising a computer-readable storage medium having a computer-readable program code stored therein, said computer-readable program code containing instructions configured to be executed by a processor of a computer system to implement the method of claim 12.

18. A process for supporting computing infrastructure, said process comprising providing at least one support service for at least one of creating, integrating, hosting, maintaining, and deploying computer-readable code in a computer system comprising a processor, wherein said computer-readable code, when executed by said processor, causes the computer system to specify the method of claim 12.

* * * * *